United States Patent [19]

Hafez et al.

[11] Patent Number: 4,496,456

[45] Date of Patent: Jan. 29, 1985

[54] METHOD FOR PREPARING THIN REGENERATED CELLULOSE MEMBRANES OF HIGH FLUX AND SELECTIVITY FOR ORGANIC LIQUIDS SEPARATIONS

[75] Inventors: Mahmoud M. Hafez, Sarnia, Canada; Henry W. Pauls, Durham, N.C.

[73] Assignee: Exxon Research and Engineering Co., Florham Park, N.J.

[21] Appl. No.: 500,966

[22] Filed: Jun. 3, 1983

[51] Int. Cl.$^3$ ...................... C10G 73/08; B01D 13/00
[52] U.S. Cl. ........................................ 208/33; 264/41; 264/187; 536/57; 210/500.2
[58] Field of Search ......................... 264/41, 187, 207; 536/57, 69, 80; 208/33; 210/500.2

[56] References Cited

U.S. PATENT DOCUMENTS

| | | |
|---|---|---|
| 264,987 | 9/1882 | Weston . |
| 981,368 | 1/1911 | Brandenberger . |
| 991,267 | 5/1911 | Brandenberger . |
| 1,350,532 | 8/1920 | Wait . |
| 2,035,645 | 3/1936 | Etzkorn et al. . |
| 2,067,522 | 1/1937 | Etzkorn et al. . |
| 2,445,333 | 7/1948 | Nichols . |
| 2,451,768 | 10/1948 | Nichols . |
| 2,459,927 | 1/1949 | Dreyfus et al. . |
| 2,962,765 | 12/1960 | Koren et al. . |
| 3,228,876 | 1/1966 | Mahon .................................. 210/22 |
| 3,412,184 | 11/1968 | Sharples et al. ..................... 264/49 |
| 3,483,282 | 12/1969 | Manjikian ............................. 264/41 |
| 3,878,276 | 4/1975 | Hoernschemeyer .................. 264/41 |
| 4,076,932 | 2/1978 | Hammer et al. ..................... 536/57 |
| 4,145,295 | 3/1979 | Kutowy et al. ..................... 210/500 |
| 4,367,191 | 1/1983 | Cuculo et al. ....................... 264/187 |

FOREIGN PATENT DOCUMENTS

| | | |
|---|---|---|
| 345001 | 8/1978 | Austria . |
| 344867 | 8/1978 | Austria . |
| 12630 | 6/1980 | European Pat. Off. . |
| 13834 | 6/1980 | European Pat. Off. . |
| 413511 | 5/1925 | Fed. Rep. of Germany .......... 296/3 |
| 2413157 | 10/1974 | Fed. Rep. of Germany . |
| 094517 | 3/1980 | Japan . |
| 094521 | 3/1980 | Japan . |
| 097209 | 3/1980 | Japan . |
| 1240560 | 7/1971 | United Kingdom . |
| 1243507 | 8/1971 | United Kingdom . |
| 1349394 | 4/1974 | United Kingdom . |

OTHER PUBLICATIONS

"Novel Regenerated Cellulose Membranes For the Artificial Kidney", Kulshrestha, et al., Applied Polymer Science, vol. 3, p. 297, 1970.

"Progress in Separation and Purification", Perry & Van Oss (editors), vol. 3, Wiley-Interscience, pp. 105–106; 122–124.

"Cellulose Solvents", Turbak, et al., Chemtech, Jan. 1980, pp. 51–57.

"The Solution and Regeneration of Cellulose Using Novel Solvent Systems", Guthrie, et al., Polymer, Feb. 1977, vol. 18, pp. 203–204.

"Dimethyl Sulfoxide/Paraformaldehyde: A Nondegrading Solvent for Cellulose", Johnson, et al., Applied Polymer Symposium Series No. 28, 931–943/1976.

*Primary Examiner*—James Lowe
*Attorney, Agent, or Firm*—Joseph J. Allocca

[57] ABSTRACT

A method is described for the production of regenerated cellulose membranes which method comprises the steps of:
(a) dissolving a cellulose material to form a solution;
(b) casting the cellulose solution into a film;
(c) coagulating the cellulose solution film using an alkali alcoholic solution;
(d) washing the coagulated cellulose film in an alcohol;
(e) regenerating the cellulose film using acidic alcohol solution;
(f) washing the regenerated cellulose membrane using an alcohol.

The regenerated cellulose thus formed may be dried, if desired, preferably without a softener.

The regenerated cellulose thus produced, when prepared in the form of a film or membrane, possesses higher flux and superior selectivity for organic liquid separation than regenerated cellulose membranes prepared employing aqueous solutions in steps b through e above and is most advantageously employed for the recovery of polar dewaxing solvents (e.g. ketones and mixed ketone/aromatic solvents) from dewaxed oil.

30 Claims, No Drawings

METHOD FOR PREPARING THIN REGENERATED CELLULOSE MEMBRANES OF HIGH FLUX AND SELECTIVITY FOR ORGANIC LIQUIDS SEPARATIONS

DESCRIPTION OF THE INVENTION

It has been discovered that regenerated cellulose membranes prepared by the use of alcoholic solutions during the coagulation, washing, regeneration and final washing sequences of preparation possess higher flux and selectivity for organic liquid separations, especially the separation of ketone dewaxing solvents from oil.

The regenerated cellulose membranes produced by the process of the present invention are dry membranes, that is, membranes which need not be stored wet or in the presence of a softening agent such as glycerol.

The procedure for preparing these high flux, high selectivity regenerated cellulose membranes involves the steps of:
  (a) dissolving a cellulose material in a solvent to form a solution;
  (b) coagulating the cellulose solution into a film using an alkali alcoholic solution;
  (c) washing the coagulated cellulose in an alcohol;
  (d) regenerating the washed coagulated cellulose using acidic alcoholic solution;
  (e) washing the regenerated cellulose using an alcohol.

The washed regenerated cellulose membranes are dried, preferably in the absence of a softener (glycerol).

BACKGROUND OF THE INVENTION

Regenerated cellulose is the term given to cellulose precipitated from a chemically dissolved native cellulose. It is also referred to as cellulose II and is different from native cellulose in having a lower molecular weight (degree of polymerization), less molecular entanglement, less degree of crystallinity, as well as a modified allotropic structure of the crystalline region (unit cell having different dimensions than native cellulose).

Regenerated cellulose was first prepared by denitrating cellulose nitrate, according to U.S. Pat. No. 264,987. This process has been commercialized as described by U.S. Pat. No. 2,445,333 and U.S. Pat. No. 2,451,768. However, the most common manufacturing methods for commercial production today are the viscose and the cupramonium methods. In the first process cellulose is regenerated from cellulose xanthate solution as described in U.S. Pat. Nos. 981,368 and 991,267 and German offen No. 413,511. Regenerated cellulose membranes prepared by this process are called celluphane. The cupramonium process regenerates cellulose in a similar manner to the viscose process from its soluble copper complex formed by reacting with ammoniacal copper sulphate, according to U.S. Pat. Nos. 2,035,645 and 2,067,522. The regenerated cellulose membranes prepared by this process are called cuprophane.

The most recent method of preparing regenerated cellulose uses cupriethylene diamine to dissolve the cellulose by complex formation. The resulting solution is used to regenerate cellulose in the normal manner according to V. K. Kulshrestha and W. J. Kolff. J.P.S. No. 297, 1970. Membranes prepared this way are called cuenophane.

Other methods of dissolving cellulose by complex formation have been cited in the prior art, e.g., dissolution in $SO_2$ + ethylene diamine + DMSO or DMSO + Paraformaldehyde at 95°–100° C. [see: "DMSO/Paraformaldehyde: A Nondegrading Solvent For Cellulose", Johnson, Nicholson and Haigh; Applied Polymer Symposium, Series 28 931–943, 1976; "The Solution and Regeneration of Cellulose Using Novel Solvent Systems", Guthrie and Hardcastle, Polymer 18, pg 203–04, February 1977; and "Cellulose Solvents" Turbak, et al., Chemtech, pg. 51–57, Jan. 1980].

Irrespective of the method of preparation, all forms of regenerated cellulose are essentially the same. Cuenophane is claimed to be more permeable by virtue of the fact that it has less crystalline structure. Apart from that all regenerated cellulose membranes have similar properties, with average thicknesses from <5 $\mu$M up to 200 $\mu$M, equivalent average pore radius of about 21 Å and a molecular weight cut off (MWCO) of about 10,000 to 12,000. This last parameter is a standard ultrafiltration measure denoting the size of pores capable of >99% rejection of protein molecules in aqueous systems where they coil up in spherical form.

All regenerated cellulose membranes, like most other membranes, cannot be dried. If dried the membrane's internal structure collapses by intra chain hydrogen bonding. These membranes must be kept wet at all times. For example, GB Pat. No. 1,349,394 describes a method to preswell regenerated cellulose by glycerol so that the membrane can be handled dry and used directly to permeate water.

Because of its pore size, regenerated cellulose is very useful for, and has found extensive use in, hemodyalysis and hemofiltration to purify blood of toxins in the artificial kidney. This is the most relevant use of regenerated cellulose as far as this patent is concerned. Regenerated cellulose is also extensively used for fiber production as a wrapping material, in the form of beads and sponges for adsorption and in preparing molded objects.

It is also reported in the prior art that regenerated cellulose was found useless for water desalting (U.S. Government Report 907, J. K. Smith, E. Klein, Office of Saline Water Res., Washington, DC 1970) because of its poor salt rejection compared with cellulose acetate.

Regenerated cellulose membranes may be converted into a hydrophobic form and used for organic liquid separation especially separation of ketone dewaxing solvents from dewaxed oils as presented in U.S. Ser. No. 263,116 U.S. Ser. No. 263,117 and U.S. Ser. No. 263,307, (See European Patent Application Publication No. 13,834), hereby incorporated by reference. In choosing the regenerated cellulose membrane which is to be subjected to the above identified conversion process one must select that membrane having a pore size such that it will provide the desired selectivity after the conversion process. If the regenerated cellulose membrane possesses pores of too large a size, the membrane, even after treatment, may still allow all molecules in the feed stream to pass in an unhindered manner through the membrane and thus prove to be non-selective.

So, in summary, regenerated cellulose membranes are prepared by three main methods to produce very similar membranes called celluphane, cuprophane and cuenophane. All membranes have similar average pore radii of about 20 Å and can vary in thickness from <10 $\mu$M to 200 $\mu$M and must be kept wet at all times. The most important use of that membrane is in hemodyalysis, hemofiltration, and polar organic liquids separation.

THE PRESENT INVENTION

Regenerated cellulose membranes of high flux and selectivity for organic liquid separations, especially the separation of ketone dewaxing solvents from oil, are prepared by the use of alcoholic solutions during the coagulation, washing, regeneration and final washing sequences of the preparation procedure. The membranes so produced are dry membranes which need not be stored wet or in the presence of softening agents such as glycerol. The regenerated cellulose membranes are prepared using the following sequence of steps:

(a) DISSOLVING A CELLULOSE MATERIAL TO FORM A SOLUTION

Any of the typical, standard methods employed in the art for the preparation of cellulose solutions as, for example, in the preparation of prior art cellophane, cuenophane, or cuprophane may be used for the preparation of the initial cellulose solution employed in the present invention.

Cellulose, for example, cotton fiber, paper, wood cellulose, bast fibers, leaf fibers, and grasses is dissolved into solution using, for example, cuene ($Cu(OH)_2$ in ethylene diamine). The use of alcoholic solutions at this stage does not appear to be critical, all that is essential is that a cellulose solution be formed. Consequently, standard procedures may be employed. The cellulose source employed however may be any cellulose which has about 1000 or more molecular degree of polymerization (DP). Low DP cellulose, for example, Baker microcrystalline cellulose having 300–400 DP, does not dissolve in cuene and is unsuitable for membrane preparation because of the weak membrane structure produced. The higher the DP, the stronger the membrane ultimately produced.

The cellulose concentration in the solution has been found to significantly contribute to the porosity of the regenerated cellulose which is eventually produced. High concentration of cellulose, typically >5% lead to less porous materials while concentrations of <2% do not produce the desired films. Cellulose concentrations of about 2% or greater are preferably used in producing the membranes of the present invention.

(b) CASTING THE CELLULOSE SOLUTION INTO A FILM

The cellulose solution from step (a) is cast into films via methods and techniques common in the art. These are subsequently treated (as herein described) so as to produce the desired regenerated cellulose membranes. One technique employed in the laboratory involves evenly spreading the cellulose solution over the length of a glass casting plate using a casting knife. Other casting techniques may be employed including deposition of the cellulose solution as a film on a moving belt, extrusion of the solution etc. to produce a film, tube, or fiber. Regardless of the technique employed, the thin film of cellulose is then subjected to coagulation, washing, regeneration and washing steps using the alcoholic solutions and alcohol washes described in the present invention.

As used in this specification, the term "casting" includes drawing or spreading the cellulose solution by means of a blade or other spreader means, spraying, pouring or otherwise depositing a layer of the cellulose solution onto a surface such as a plate or belt, extruding or otherwise producing a film of the cellulose solution by manipulative methods or techniques common to the art of membrane fabrication.

(c) COAGULATING THE CELLULOSE SOLUTION FILM USING AN ALKALI ALCOHOLIC SOLUTION

The cellulose solution prepared by the typical prior art techniques is then coagulated. In comparison with prior art coagulation, which uses aqueous alkali solutions, the process of the present invention must employ alcoholic alkali solution. As in the prior art, the alkali may be KOH or NaOH, preferably NaOH. Mixtures of alkali may also be used but NaOH by itself is preferred. The alkali concentration employed in the present invention ranges from about 5% to about 20%. Alkali concentrations lower than 5% produce materials that dissolve in alcohol (e.g. methanol) while concentrations greater than 20% produce gels that do not regenerate. In practice, however, the upper limit is set by the solubility of the alkali in the alcohol. Water may be added to the alcohol to increase alkali solubility. Up to 25% water may be present in the alcoholic alkali solutions used in this step.

The alcohols used are typically the lower molecular weight alcohols, $C_1$–$C_3$ such as methanol, ethanol, n-propanol, isopropanol, and mixtures thereof, preferably methanol.

Lower molecular weight alcohols are employed because this solution may contain up to 25% water. It is therefore necessary that the alcohol employed be miscible with the water.

(d) WASHING

The coagulated cellulose material is washed to remove alkali. While in the prior art aqueous washes are employed, in the present invention it has been discovered that the washing must be with alcohol, i.e., the low molecular weight $C_1$–$C_3$ alcohols and mixtures thereof, preferably methanol. The alcohol employed in this step may be technical grade alcohol. Some water may be present up to 10%. Methanol containing up to 10% $H_2O$, known as methyl hydrate may be used in this process step. It is preferred that the water content of the alcohol used in this washing step be kept to a minimum.

(e) REGENERATING THE CELLULOSE USING ACIDIC ALCOHOL SOLUTIONS

The washed coagulated cellulose is then regenerated. Unlike the prior art which uses aqueous acid solutions to effect regeneration, the invention of the present specification practices regeneration using alcoholic acidic solutions. The type of acids which may be employed include mineral acids, such as HCl, $H_2SO_4$, $HNO_3$, etc. and mixtures thereof, preferably $H_2SO_4$.

The alcohols employed are as previously recited for the coagulation and washing steps, i.e., the lower molecular weight $C_1$–$C_3$ alcohols and mixtures thereof, preferably methanol.

Up to 25% water may be present in the regeneration alcoholic acid solution of this step.

The acids are used as alcoholic solutions at concentrations governed by the acid solubility limit in the alcoholic solution. This concentration typically ranges from between about 5% to 10% by weight.

(f) WASHING

The regenerated cellulose material is finally washed in alcohol to remove the acid. The alcohols used in this step are the same as those of the previous steps, preferably methanol. Technical grade alcohols are acceptable, (see step d).

As a final step, if the membrane is not to be used immediately, one may dry the material. Unlike prior art regenerated cellulose which cannot be dried per se, but only in the presence of a softening agent such as glycerol, the regenerated cellulose of the present invention may be dried in the absence of any softening agent without adverse effects on its organic permeability. This drying is normally effected at not more than 60° C., preferably room temperature, preferably in air, but any non-degenerative atmosphere may be used.

The regenerated cellulose membrane material of the present invention may be employed in the form of sheets, tubes, fibers, etc., preferably sheets.

The regenerated cellulose membranes prepared by the technique of the present invention are similar to prior art regenerated cellulose membranes insofar as chemical composition and thickness of film is concerned, thickness typically being from <5 μm to about 200 μm.

However, while regenerated cellulose membranes typically possess average pore radii of about 21 Å, (or greater) or a molecular weight cutoff (MWCO) of about 10,000 to 12,000, (or greater) and have about 16–19% porosity, the regenerated cellulose membranes prepared by the technique of the present invention, are more porous (23–28% porosity; i.e., more permeable then prior art regenerated cellulose), possess smaller pores (14–16 Å), can be dried. After treatment in accordance with the procedure of EP Publication No. 13834 they are useful for polar organics permeation. It is this combination of high porosity and smaller pores which distinguishes the regenerated cellulose membranes of the present invention from the regenerated cellulose membranes of the prior art.

Regenerated cellulose membranes produced by the presently disclosed process are thus very effective, due to their high flux and selectivity, for the separation of polar dewaxing solvents from dewaxed oil. The dewaxing solvent recovery procedure described in U.S. Ser. No. 263,307, which employs regenerated cellulose preconditioned in accordance with the technique of U.S. Ser. No. 263,116, is seen to be significantly improved by employing the regenerated cellulose of the present invention as the separation membrane. Details of the various dewaxing processes to which the present invention can be applied are given in U.S. Ser. No. 263,307 and EP Publication No. 13834.

Waxy hydrocarbon streams are solvent dewaxed employing any one of a number of different processes. Representative, non-limiting examples include solvent dewaxing processes employing indirect heat exchange in a scraped-surface chiller wherein waxy oil and solvent, at approximately the same temperature, are mixed in such a manner so as to effect complete and thorough solution of the oil in the solvent before being cooled or chilled. This solution is then cooled at a uniform, slow rate under conditions which avoid agitation of the solution as the wax precipitates out.

Another well-known method of solvent dewaxing involves conventional, incremental solvent addition. In this method, solvent is added to the oil at several points along a chilling apparatus. However, the waxy oil is first chilled with solvent until some wax crystallization has occurred and the mixture has thickened considerably. A first increment of solvent is introduced at this point in order to maintain fluidity, cooling continues and more wax is precipitated. A second increment of solvent is added to maintain fluidity. This process is repeated until the desired oil-wax filtration temperature is reached, at which point an additional amount of solvent is added in order to reduce the viscosity of the mixture to that desired for the filtration step. In this method the temperature of the incrementally added solvent should also be about the same as that of the wax/oil/solvent mixture at the point of introduction. If the solvent is introduced at a lower temperature, shock chilling of the slurry usually occurs, resulting in the formation of small and/or acicula shaped wax crystals with attendant poor filter rate.

Still another well-known process is the DILCHILL$^R$ process wherein a waxy oil is introduced into an elongated, staged cooling zone or tower at a temperature above its cloud point and incrementally introducing cold dewaxing solvent into said zone, along a plurality of points or stages therein, while maintaining a high degree of agitation so as to effect substantially instantaneous mixing of the solvent and wax/oil mixture as they progress through said zone and resulting in the precipitation of at least a portion of the wax present in the waxy oil. The basic concept is shown in U.S. Pat. No. 3,773,650 while a modification thereof which employs the aforementioned high agitation chilling zone augmented by a subsequent, separate and distinct scraped surface chilling zone is presented in U.S. Pat. No. 3,775,288, the disclosures of both of which are incorporated herein by reference.

$^R$ Registered service mark of Exxon Research and Engineering Company.

Any solvent useful for dewaxing waxy hydrocarbon oil stocks may be used in the process of this invention. Representative examples of such solvents are (a) the aliphatic ketones having from 3 to 6 carbon atoms, such as acetone, methyl ethyl ketone (MEK) and methyl isobutyl ketone (MIBK), and (b) mixtures of the aforesaid ketones with $C_6$–$C_{10}$ aromatics such as benzene, xylene and toluene. In addition, halogenated, low molecular weight hydrocarbons such as the $C_1$–$C_4$ chlorinated hydrocarbons, e.g., dichloromethane, dichloroethane, and mixtures thereof, may be used as solvents either alone or in admixture with any of the aforementioned solvents. Preferred solvents are MEK/MIBK and MEK/toluene.

The solvent dewaxing of any waxy hydrocarbon oil stock, preferably waxy petroleum oil stock or distillate fraction thereof, more preferably waxy lube oil, transformer oil, white oil or fuel oil stocks may be dewaxed employing any of the dewaxing process previously recited or otherwise practiced in the art may be improved by using the membrane-solvent recovery process described here in the process of this invention. Illustrative, non-limiting examples of waxy stocks are (a) distillate fractions that have a boiling range within the broad range of about 500° F. to about 1300° F., with preferred stocks including the lubricating oil and specialty oil fractions boiling within the range of between about 500° F. and 1200° F., (b) bright stocks and deasphalted resids having an initial boiling point about 800° F., and (c) broad cut feedstocks that are produced by topping or distilling the lightest material off a crude oil leaving a broad cut oil, the major portion of which boils above about 500° F. or 650° F. Additionally, any of these feeds may be hydrocracked prior to distilling, dewaxing or topping. The distillate fractions may come from any source such as the paraffinic crudes obtained from Aramco, Kuwait, the Pan Handle, North Louisiana, etc., naphthenic crudes, such as Tia Juana, Coastal crudes, etc., as well as the relatively heavy feedstocks, such as bright stocks having a boiling range of 1050+°

F. and synthetic feedstocks derived from Athabasca Tar Sands, shale, etc.

The solvent recovery process employs regenerated cellulose membranes after treatment in accordance with the procedure of U.S. Ser. No. 263,116 which comprises sequential permeation through the membrane of at least two solvents of decreasing polarity, under a pressure (about 100–800 psi). If the membrane is still wet with alcohol from the last step of the preparation sequence it merely needs to be pressure permeated with a ketone which is miscible with the alcohol (bulk miscibility) in order to be preconditioned for use in the separation process. Alternatively, if the membrane has been permitted to dry after the final alcohol wash step of the preparation sequence it should be permeated using a sequence of solvents of decreasing polarity (e.g. alcohol and ketone) under pressure in order to be readied for use in the separation process. Finally, if the membranes of the present invention has been dried using glycerol, as described in the art, the full procedure of Ser. No. 263,116 must be employed including a water soak to remove the glycerol followed by sequential permeation of a series of solvents of decreasing polarity, under pressure. A low molecular weight alcohol or ketone which is miscible with water (bulk miscibility) is used as the first solvent and is followed by a solvent which is miscible (bulk miscibility) with both the higher polarity solvent immediately preceding it and with the lower polarity solvent following it. In general, it is preferred that the membrane be conditioned by using a low molecular weight alcohol or ketone miscible with water as the first solvent followed by the dewaxing solvent with which it is miscible. Once the regenerated cellulose membranes have been conditioned in accordance with the above recited procedure drying of the membranes is undesirable as it results in collapse of the membrane structure.

The separation process is practiced by contacting mixtures of dewaxing solvent and dewaxed oil (which result after removal of the precipitated wax therefrom by liquid/solid separation procedures such as filtration, centrifugation, settling/decanting, etc.) with the membrane, under pressure sufficient to overcome the osmotic pressure of the solvent in the solvent/oil mixture. A permeate rich in dewaxing solvent and a retentate lean in dewaxing solvent are produced. The permeate is recycled back to the dewaxing operation while the oil is recovered from the retentate by distillation or stripping.

The preconditioned membrane may be employed in any convenient form including sheets, bundles of hollow fibers, tubes, etc. formed into elements, for example, as bundles of tubes or fibers as described, for example in U.S. Pat. No. 3,228,877, or sheet material fabricated into spiral wound element configurations as described for example, in U.S. Pat. Nos. 3,417,870, 3,173,867, 3,367,594, 3,386,583, 3,397,790.

In fabricating such spiral wound elements various adhesives, spacers, backings, seals, etc. are employed. For use in a ketone solvent-dewaxed oil separation process the spiral wound element will typically comprise layers of regenerated cellulose (prepared as described herein) wound around a central tube (metal or solvent resistant plastic) containing holes for the permeate, the membrane layers being separated by alternate layers of a permeate carrier such as knitted Simplex (Dacron, with melamine formaldehyde stiffener) and a feed spacer made of Vexar (a polypropylene mesh). Membrane layers are sealed using an epoxy adhesive to sandwich the permeate carrier into a closed envelope in fluid communication with the perforated central tube leaving the perforations in the central tube as the only permeate outlet. The epoxy adhesive will generally comprise a ketone resistant formulation such as one comprising (1) Epon 828 which is a reaction product of bis-phenol A and epichlorohydrin (2) Cabosil M5, (3) Versamid 140 (a polyamide curing agent) (4) Estane 5707F-1 (a poly urethane from B. F. Goodrich) and (5) DMF solvent wherein the components 1/2/3/4/5 are present in a typical relationship based on parts by weight of about 100/10/60/4/12, which cures at about 25° C. over about a 21 day period. This adhesive system is described and claimed in copending application Attorney Docket No. OP 2993, U.S. Ser. No. 06/494,409 filed in the names of William M. King and William W. Wight, now Pat. No. 4,464,494. The layers of membrane, permeate carrier and feed spacer are wound around the central tube in a fashion consistent with preparing a spiral wound element. After the element is cured, the ends of the element are trimmed; a nylon seal carrier and a nylon anti-telescoping device are then added. The element is then covered on the outside with an epoxy reinforced fiber glass outer wrap. Elements of any size can be prepared but typical elements are about 8 inches in diameter and about 40 inches long and have 395 square feet of membrane area and can be used at feed flow rates of about 30–50 gallons per minute at a 5–15 psi pressure drop.

Any number of such elements can be arranged in parallel and/or in series as may be required. Because the preconditioned membrane process will typically be employed to supplement traditional solvent recovery processes such as distillation or stripping it constitutes a method for either debottlenecking or for increasing plant capacity or both, while at the same time reducing the energy requirements for solvent recovery.

EXAMPLES (GENERAL PROCEDURES)

i. Preparation of Cuene:

Freshly precipitated Cu(OH) is treated with 2 equivalent of ethylene diamine (EDA) per mole of Cu under nitrogen. The mixture is shaken for 12–16 hr. The solution is filtered and titrated for Cu and EDA and the composition adjusted to 1 m Cu and 2 m EDA. Cuene solution is stored in the dark at 5° C.

ii. Dissolution of Cellulose:

0.5 gm Cu washed with 3% HCl then $H_2O$ to remove $Cl^-$ ions was mixed with 5 gm cellulose and 125 ml of cuene solution and shaken under $N_2$ for 16 hours to dissolve the cellulose. Resulting solution is degassed and allowed to stand for 24 hr at 5° C. in the dark before use.

iii. Membrane Casting: (According to the casting method of V. K. Kulshrestha and W. J. Kolf as described in Applied Polymer Synposia Vol. 3 pg. 297.1975.) Cellulose solution of (ii) was evenly spread over a 6–8″ length at one end of the glass casting plate (11″×14″). An aluminum casting knife preset at 10 mil was drawn mechanically at an even rate down the entire length of the casting plate. Casting is carried out at room temperature (~22±2° C.).

iv. Coagulation: The glass and film were carefully placed in the coagulation bath of 10% NaOH solutions (in water and/or methanol). After 15 minutes the coagulated film was washed with solvent (water and/or methanol) until neutral pH was obtained.

v. The film was then regenerated in 8% $H_2SO_4$ solutions (in water and/or methanol) for 10 minutes. The supported film was washed with hot then cold water (or methanol).

vi. The resulting membrane was dried without or with softening (in 20% glycerol solution for 5 minutes), for about 16–48 hours at temperatures 20°–60° C.

EXAMPLE 1: BASE CASE CUENOPHANE MEMBRANE (Comparative Prior Art Membrane see V. K. Kulshrestha and W. J. Kolf, Applied Polymer Symposia. Vol. 3 page 297, 1970.)

Cuenophane membranes were prepared according to the preparation procedure mentioned above with the following details:

(a) Hercules PS 33 cellulose (DP of 3000) was mixed in blender until fluffy and 5 gm were mixed with 125 ml cuene solution (prepared as above) and with 0.5 gm Cu previously washed with 3% HCl and water.

(b) The solution was cast from a 10 mil knife, coagulated in an aqueous solution of 10% NaOH for 15 minutes. It was then washed with distilled water until neutral. The membrane then regenerated from 8% aqueous $H_2SO_4$ for 10 minutes, and then washed with $H_2O$ to remove the acid.

(c) The membrane was soaked in 20% glycerol for 5 minutes, then dried in an oven at 55° C. for 16 hr.

Upon drying, this membrane has a dry thickness of about 1 mil. The membrane was preconditioned according to U.S. Ser. No. 263,116 (See EP Publication No. 13834) and tested for the separation of ketone-oil mixtures. Preconditioning involved soaking the glycerol dried membrane in warm water to remove the glycerol by solvent exchange (no pressure). The water soaked membrane was mounted in a test cell and pressure exchanged (400 psi) with methanol for 1 hour, then pressure exchanged (400 psi) with methyl ethyl ketone for 1 hour. Temperature during preconditioning was maintained at room ambient, about 22±2° C. The membrane is then ready for processing feed streams. It was found that this membrane is very permeable but not selective. The flux was measured at 400 psig at 23° C.

| Membrane No. | Flux 1/M² day | | Rejection | |
|---|---|---|---|---|
| | of Ketone | of Oil Ketone Mixture | % Oil in Permeate | % Oil in Feed |
| 19 | 37500 | 12000 | 19 | 20 |
| 12 | 6300 | 1700 | 17 | 20 |

EXAMPLE 1a: BASE CASE COMMERCIAL CUPROPHANE MEMBRANE

A commercial regenerated cellulose membrane (PM250 cuprophane, membrane produced by ENKA (about 12,000 MWCO about 17.5μ thick) was treated by the preconditioning sequence described in Example 1. The thus treated membrane was then employed to separate MEK from oil. The ketone/oil feed was 20 wt% 600N oil in pure MEK. The flux was measured at 400 psig at room ambient temperature (about 20±2° C.).

| Pure MEK flux 1/m²/d | 600 |
|---|---|
| Permeate flux 1/m²/d | 350 |
| Permeate oil content % | 4.0 |
| Rejection | 83% |

EXAMPLE 1b: BASE CASE COMMERCIAL CELLOPHANE MEMBRANE

A commercial regenerated cellulose membrane obtained from "Spectrum Medical", cellophane having a 10,000–12,000 MWCO, 47 mils thick was treated by the preconditioning sequence described in Example 1. The membrane was then employed to separate MEK from oil. The betane/oil feed was 19.6 wt% 600N oil in pure MEK. The flux was measured at 400 psig at 23° C.

| Pure MEK flux 1/m²/d | 660 |
|---|---|
| Permeate flux 1/m²/d | 110 |
| Permeate oil content % | 7.8 |
| Rejection | 60% |

From the above examples it is seen that using prior art regenerated cellulose one achieves either high selectivity, but at the expense of low flux (Example 1a and 1b) or high flux but at the expense of low selectivity (Example 1).

By contrast, it has been discovered (and will be shown in the following examples) that by practice of the present invention one can prepare a regenerated cellulose membrane which possesses the previously mutually exclusive characteristics of high flux and good selectivity for organic liquids simultaneously.

EXAMPLE 2: PREPARATION FROM METHANOLIC CUENE SOLUTIONS

Attempts have been made to dissolve the cellulose in methanolic cuene solutions such that the whole process of preparation (including the dissolution step) is carried out in MeOH. Freshly precipitated Cu(OH) in MeOH and subsequent addition of ethylene diamine resulted in a blue solution of the proposed structure [Cu(ECA)$_2$.(MeOH)$_2$]. This methanolic cuene did not dissolve cellulose and it was deemed therefore necessary to carry out the dissolution step in aqueous cuene.

EXAMPLE 3: EFFECT OF MeOH AND NaOH CONCENTRATION IN COAGULATION SOLUTION

Cuenophane membranes were prepared according to the procedure described above (Example 1) Hercules PS33 cellulose except that the coagulation step was carried out in methanolic solutions of NaOH of varying MeOH/water ratios. The subsequent steps of washing, regeneration and washing were carried out in water and the drying was conducted in glycerol, (as the standard procedure), so the only change in the state of the art procedure was the addition of MeOH to the coagulation bath.

This procedure resulted in tighter membranes, than the base case (19) but they would not be tight enough to provide the required rejection for the oil molecules. This is evident from the pure ketone permeation rate of preconditioned membranes (preconditioning conducted as described in Example 1) and from the selectivity data provided in Table 1.

| Membrane | % MeOH in Coagulation Solution | % NaOH | Flux 1/M² day MeOH | Ketone |
|---|---|---|---|---|
| 19 | 0 | 10 | 7900 | 37500 |
| 12 | 50 | 10 | 1300 | 6300 |
| 20 | 75 | 10 | 1100 | 5700 |
| 14 | 75 | 15 | 620 | 2000 |
| 14a | 100 | 5 | 2300 | 10500 |

Pure MeOH (14a) does not dissolve enough NaOH and open membranes are obtained, while when 75% MeOH is used (14), NaOH concentrations need to be increased to 15%.

This example shows that the replacement of water by MeOH gives more tight membranes but not tight enough to provide required selectivity. As the MeOH concentration is increased the NaOH concentration must be increased to improve coagulation. In pure MeOH, the solubility of NaOH is not enough to effect good coagulation. Furthermore, methanolic coagulation alone would not be enough to produce the desired high selectivity, although some degree of improvement is achieved. In this example only ketone was contacted with the membrane to determine the ketone flux, which is related to oil selectivity.

EXAMPLE 4: EFFECT OF MeOH IN COAGULATION AND REGENERATION SOLUTION AND AS WASHES

If in addition to coagulating in 75% MeOH solution containing 15% NaOH, MeOH is used as the wash (100% MeOH) and in the regeneration solution (75% MeOH solution containing 8% $H_2SO_4$) and in the final wash (100% MeOH) the resulting membrane becomes more tight and more selective.

This is seen in Table 1, which shows the performance of the membranes produced by various combinations.

| Membrane[a] | Coagulation Bath | Regeneration Bath | Wash Bath | MEK Flux 1/M² d | Oil Rejection % (Selectivity) |
|---|---|---|---|---|---|
| 19 | $H_2O$ + 10% NaOH | $H_2O$ + 8% $H_2SO_4$ | $H_2O$ | 37,500 | — |
| 14 | 75% MeOH + 15% NaOH | $H_2O$ + 8% $H_2SO_4$ | $H_2O$ | 2,000 | — |
| 18[1] | $H_2O$ + 10% NaOH | 75% MeOH + 8% $H_2SO_4$ | $H_2O$ | 3,500 | 18 |
| 22 | $H_2O$ + 10% NaOH | $H_2O$ + 8% $H_2SO_4$ | MeOH | 25,000 | — |
| 23[1] | 75% MeOH + 15% NaOH | 75% MeOH + 8% $H_2SO_4$ | $H_2O$ | 3,500 | 7 |
| 34[1] | 75% MeOH + 15% NaOH | 75% MeOH + 8% $H_2SO_4$ | MeOH | 650[b] | 80 |
| 48[1] | 75% MeOH + 15% NaOH | 75% MeOH + 8% $H_2SO_4$ | MeOH | 330[c] | 91 |
| 20[1] | 75% MeOH + 15% NaOH | 75% MeOH + 8% $H_2SO_4$ | MeOH | 65[d] | 94 |
| 12[1] | $H_2O$ + 10% NaOH | $H_2O$ + 8% $H_2SO_4$ | $H_2O$ | 6,300 | 15 |

[1] 20% 600N oil in MEK; 400 psi 20 ± 2° C.
[a] Membrane thickness is 18 ± 2.5 m.
[b] Softened and Dried.
[c] Dried at room temperature for 48 hours in absence of softener.
[d] Dried at room temperature for 48 hours after ketone conditioning according to USSN 263,116.

In this example, the procedure of Example 3 was used with the noted changes above.

The performance of the resulting membranes are shown above after they have been preconditioned following the procedure described in Example 1 and used for ketone permeation. It is clear that failure to achieve required selectivity is due to the presence of water in any one of the preparation steps.

This example also shows the effect of drying the membrane. It shows that post regeneration drying in absence of softeners is very important to membrane performance and that drying after conditioning is not desirable. Since membrane performance is a combination of selectivity and premeability, the best, optimum membrane would possess maximum selectivity while retaining a practical, relatively high level of permeability. Under these criterion, the optimum membrane in the above example is seen to be Membrane 48 (dried in the absence of softener) which demonstrates a flux of 330 l/m²d and an oil rejection (selectivity) of 91%.

EXAMPLE 5: OPTIMUM MEMBRANE

Optimum membrane has been identified as one prepared according to the general preparation procedure with the following details:

1. Cuene solution—aqueous as described in Example i.
2. Dissolution of cellulose in 5% cuene solution using Hercules PS33 Cellulose (DP ~3000)
3. Spreading using a 10 mil thick knife, which gives dry membranes 1 mil
4. Coagulation—using 75% MeOH, 15% NaOH in water solution—15 minutes
5. Wash (1)—100% MeOH until neutral
6. Regeneration—using 75% MeOH, 8% $H_2SO_4$ in water solution—10 minutes
7. Wash (2)—100% MeOH until neutral
8. No softening
9. Room temperature dried for 48 hours in air.

The regenerated cellulose prepared by the technique of the present invention was compared with a commercial regenerated cellulose for the separation of ketone from oil. Tests were carried out in lab plate and frame dynamic cells at ambient temperature (about 20±2° C.) under 400 psi operating pressure using 20% 600N dewaxed oil in ketone. The table compares the results of two membrane samples 47 and 48 secured from the same batch of membrane made by the procedure of the present invention with those of a commercial one.

| Membrane | Flux 1/m²day Ketone | 20% Soln (oil/MEK) | % Oil in Permeate | Selectivity |
|---|---|---|---|---|
| 47,48 | 350 ± 30 | 300 ± 50 | 2 ± 0.2 | 91% |
| PM 250 | 600 ± 30 | 350 ± 40 | 4 ± 0.2 | 83% |

As can be seen, flux in l/m²/day is generally similar while selectivity is greatly improved.

What is claimed is:

1. A method for producing a regenerated cellulose membrane comprising the steps of:
   A. dissolving a cellulose material to form a solution;
   B. Casting the cellulose solution into a film;
   C. coagulating the cellulose solution film using an alcoholic-alkali solution;

D. washing the coagulated cellulose film in an alcohol;

E. regenerating the washed, coagulated cellulose film using an alcoholic acid solution;

F. washing the regenerated cellulose membrane using an alcohol.

2. The method of claim 1 wherein the cellulose material of step A has a molecular degree of polymerization (DP) of 1,000 or more.

3. The method of claim 2 wherein the cellulose material is dissolved in cuene, the cellulose concentration in the solution being about 2% or greater.

4. The method of claim 1, 2 or 3 wherein the alcoholic alkali solution of step C contains about 5% to about 20% alkali.

5. The method of claim 4 wherein the alkali in the alcoholic alkali solution is KOH, or NaOH.

6. The method of claim 5 wherein the alcohol of the alcoholic alkali solution is a $C_1$–$C_3$ alcohol and mixtures thereof.

7. The method of claim 6 wherein the alcoholic alkali solution contains up to 25% water.

8. The method of claim 1, 2 or 3 wherein the alcohol used in the washing step D is a $C_1$–$C_3$ alcohol and mixtures thereof.

9. The method of claim 8 wherein the alcohol contains up to 10% water.

10. The method of claim 7 wherein the alcohol used in the washing step D is a $C_1$–$C_3$ alcohol and mixtures thereof containing up to 10% water.

11. The method of claim 1, 2 or 3 wherein the alcoholic acid solution used in regenerating step E is made up of mineral acids in $C_1$–$C_3$ alcohols and mixtures thereof.

12. The method of claim 11 wherein the acid concentration in the alcoholic acid solution ranges from between about 5% to 10% by weight.

13. The method of claim 12 wherein the alcoholic acid solution contains up to 25% water.

14. The method of claim 10 wherein the alcoholic acid solution used in regenerating step E uses a mineral acid at a concentration of 5%–10% by weight in a $C_1$–$C_3$ alcohol and mixtures thereof which alcohol contains up to 25% water.

15. The method of claim 1, 2 or 3 wherein the alcohol used in the alcohol washing step D is a $C_1$–$C_3$ alcohol and mixtures thereof.

16. The method of claim 15 wherein the alcohol used in the alcohol washing step F contains up to 10% water.

17. The method of claim 14 wherein the alcohol used in the alcohol washing step F is a $C_1$–$C_3$ alcohol and mixtures thereof containing up to 10% water.

18. The method of claim 1 further comprising drying step G conducted at a temperature of up to 60° C. in a non-degenerative atmosphere.

19. The method of claim 1 wherein the regenerated cellulose membrane is from <5 to about 200 μm thick.

20. The method of claim 1 or 19 wherein the regenerated cellulose membrane is in the form of sheets, tubes or fibers.

21. A method for producing regenerated cellulose comprising the steps of:

A. dissolving a cellulose material having a molecular degree of polymerization of 1,000 or more in cuene to give a cellulose solution having a cellulose concentration of about 2% or greater;

B. Casting the cellulose solution into a film;

C. coagulating the cellulose solution film using an alcoholic alkali solution wherein the alkali is KOH or NaOH, the alcohol is a $C_1$–$C_3$ alcohol or mixture thereof, the alkali concentration in the solution being about 5% to 20% and the solution containing up to 25% water;

D. washing the coagulated cellulose film in a $C_1$–$C_3$ alcohol, containing up to 10% water;

E. regenerating the cellulose film to form a regenerated cellulose membrane using an alcoholic acid solution wherein the acid is a mineral acid present at a concentration of 5%–10% by weight, and the alcohol is a $C_1$–$C_3$ alcohol which contains up to 25% water;

F. washing the regenerated cellulose membrane in a $C_1$–$C_3$ alcohol containing up to 10% water.

22. The method of claim 21 further comprising the step of:

F. drying the regenerated cellulose at a temperature of 60° C. in a non-degenerative atmosphere.

23. The method of claim 21 or 22 wherein the regenerated cellulose membrane is from <5 to about 200 μm thick.

24. The method of claim 23 wherein the regenerated cellulose membrane is in the form of sheet, tubes or fibers.

25. A regenerated cellulose membrane prepared by the method of:

A. dissolving a cellulose material to form a solution;

B. casting the solution into the form of a film;

C. coagulating the cellulose solution film using an alcoholic alkali solution;

D. washing the coagulated cellulose film in an alcohol;

E. regenerating the washed, coagulated cellulose film using an alcoholic acid solution;

F. washing the regenerated cellulose film in an alcohol.

26. The regenerated cellulose membrane of claim 25 wherein:

A. the cellulose material of step A has a molecular degree of polymerization of 1,000 or more and is dissolved in cuene to yield a cellulose solution having a cellulose concentration of about 2% or greater;

B. the coagulation step C practiced on the cellulose film of step B employs an alcoholic alkali solution wherein the alkali is KOH or NaOH in a $C_1$–$C_3$ alcohol or mixture thereof at a concentration of 5%–20%, the alcohol containing up to 25% water;

C. the washing step D employs a $C_1$–$C_3$ alcohol or mixture thereof containing up to 10% water;

D. the regeneration step employing an alcoholic acid solution using mineral or organic acid present at a concentration of 5%–10% by weight in a $C_1$–$C_3$ alcohol or mixture thereof which contains up to 25% water;

E. the washing of the regenerated cellulose membrane employs a $C_1$–$C_3$ alcohol or mixture thereof containing up to 10% water.

27. The regenerated cellulose membrane of claim 25 further prepared by the step comprising:

G. drying the membrane at a temperature of up to 60° C. in a non-degenerative atmosphere.

28. In a process for the dewaxing of waxy hydrocarbon oils comprising:

(a) solvent dewaxing the waxy hydrocarbon oil by combining the waxy oil with a dewaxing solvent selected from $C_3$-$C_6$ ketones and mixtures thereof, and mixtures of $C_3$-$C_6$ ketones and $C_6$-$C_{10}$ aromatic hydrocarbons for a mixture and chilling said waxy oil-solvent mixture to form a slurry comprising solid particles of wax and a mixture of dewaxed oil and dewaxing solvent;

(b) passing said slurry to solid-liquid separation means to separate the solid particles of wax from the dewaxed oil/solvent mixture; and (c) contacting at least a portion of said dewaxed oil/solvent mixture, under pressure, with one side of at least one semipermeable membrane made from regenerated cellulose to form a permeate richer in said solvent than said mixture and a retentate leaner in said solvent than said mixture, wherein said membrane is prepared from a hydrophilic regenerated cellulose membrane by sequentially permeating through the membrane, under a differential pressure across the membrane, a series of solvents of decreasing polarity wherein adjacent solvents in the series exhibit bulk liquid-liquid miscibility with each other and wherein the last solvent exhibits bulk liquid-liquid miscibility with the dewaxing solvent to be permeated through the membrane, the improvement comprising using as the membrane a regenerated cellulose membrane prepared by the method of:

(i) dissolving a cellulose material to form a solution;
(ii) casting the cellulose material into a film;
(iii) coagulating the cellulose solution film using an alcoholic alkali solution;
(iv) washing the coagulated cellulose film in an alcohol;
(v) regenerating the washed, coagulated cellulose film using an alcoholic acid solution;
(vi) washing the regenerated cellulose film in an alcohol.

29. The process of claim 28 wherein the regenerated cellulose membrane synthesis procedure is marked by the following characteristics:

(a) the cellulose material of step (i) has a molecular degree of polymerization of 1,000 or more and is dissolved in cuene to yield a cellulose solution having a cellulose concentration of about 2% or greater;
(b) the coagulation step of step (iii) practiced on the cellulose film of step (ii) employs an alcoholic alkali solution wherein the alkali is KOH or NaOH in a $C_1$-$C_3$ alcohol or mixture thereof at a concentration of 5%-20%, the alcohol containing up to 25% water;
(c) the washing step (iv) employs a $C_1$-$C_3$ alcohol or mixture thereof containing up to 10% water;
(d) the regeneration step employs an alcoholic acid solution using mineral or organic acid present at a concentration of 5%-10% by weight in a $C_1$-$C_3$ alcohol or mixture thereof which contains up to 25% water;
(e) the washing of the regenerated cellulose membrane employs a $C_1$-$C_3$ alcohol or mixture thereof containing up to 10% water.

30. The process of claim 28 wherein the regenerated cellulose membrane synthesis procedure is further marked by the preparative step comprising:

(vii) drying the membrane at a temperature of up to 60° C. in a non-degenerative atmosphere in the absence of softeners.

* * * * *